United States Patent [19]
Kargol et al.

[11] Patent Number: 5,494,627
[45] Date of Patent: Feb. 27, 1996

[54] METHOD FOR MAKING A VEHICLE SEAT COMPONENT WITH IMPROVED RESISTANCE TO PERMANENT DEFORMATION

[76] Inventors: James A. Kargol, 21656 Manchester Ct., Farmington Hills, Mich. 48335; Neil J. Bush, 4585 W. Schafer, Pinckney, Mich. 48169; Steven M. Winoker, 37595 Scotsdale Cir. #203, Westland, Mich. 48185; Gregory A. Haupt, 59669 Sunridge, New Hudson, Mich. 48165; Ming Y. Kao, 7444 N. Mohawk Rd., Fox Point, Wis. 53217

[21] Appl. No.: 324,218

[22] Filed: Oct. 17, 1994

[51] Int. Cl.[6] ................................................ B29C 51/00
[52] U.S. Cl. ...................... 264/119; 264/122; 264/125; 297/452.48; 425/356; 428/171; 428/218
[58] Field of Search ............................ 264/119, 122, 264/125; 428/171, 218; 5/474; 425/356; 297/452.21, 452.27, 452.29, 452.37, 452.48, DIG. 2

[56] References Cited

U.S. PATENT DOCUMENTS

| | | | |
|---|---|---|---|
| 4,103,058 | 7/1978 | Humlicek | 428/171 |
| 5,366,678 | 11/1994 | Nomizo et al. | 264/122 |

*Primary Examiner*—Robert A. Dawson
*Assistant Examiner*—Kenneth M. Jones
*Attorney, Agent, or Firm*—Harness, Dickey & Pierce

[57] ABSTRACT

A process to form a body of thermoplastic polymeric fibers and improve the body's resistance to permanent deformation. The vehicle seat component of this invention is compressed twice at progressively greater pressures during the molding process in order to break and reform the bonds between the polymeric fibers.

1 Claim, 2 Drawing Sheets

METHOD FOR MAKING A VEHICLE SEAT COMPONENT WITH IMPROVED RESISTANCE TO PERMANENT DEFORMATION

BACKGROUND OF THE INVENTION

This invention relates generally to the field of vehicle seating where seat components must be made as efficiently as possible, preferably with easily recyclable materials, and be resistant to permanent deformation. This invention uses a novel process to form a body of thermoplastic polymeric fibers and improve resistance of the body to permanent deformation.

Presently, most vehicle seat bodies are made of polyurethane foam. While satisfactory results have been achieved with polyurethane foam, many advantages accompany the use of thermoplastic polymeric fibers. Vehicle seat bodies made of thermoplastic polymeric fibers are more breathable, can achieve equivalent support in a lower profile and lighter weight body, and can be formed and laminated with a fabric cover in a very simple and efficient process. It is also possible to employ the same polymeric material for both the thermoplastic fibers of the body and a fabric cover, so that no separating is necessary before recycling.

These advantages are achieved by covering at least some of the polymeric fibers with a fusable polymeric coating that melts and forms bonds when activated by heat. Polymeric fibers are placed in a mold cavity having the shape of the desired vehicle seat component. The polymeric fibers are then compressed and a heated atmosphere is passed through the cavity, causing the polymeric coating to melt and flow over adjacent fibers, forming bonds as it cools.

However, bodies made of thermoplastic polymeric fibers are susceptible to permanent deformation under certain conditions. If a heavy object, such as a tool box, is left on the body at elevated temperatures, a permanent mark may be left in the body in the shape of the object. This type of deformation can occur during the initial loading at an elevated temperature and to a lesser degree during subsequent loadings.

Under normal conditions, the bonds between polymeric fibers cause the body to bounce back to its original shape after being subjected to a load. However, when the temperature is elevated beyond the glass transition temperature, the weight of the object causes the weaker bonds to break and the polymeric fibers plastically deform or creep. The body no longer completely rebounds to its original shape.

The glass transition temperature is actually a finite temperature range over which the polymer retains an amorphous, liquid-like structure, but at temperatures below the glass transition temperature the molecular motion becomes frozen and the material turns into a glass. These qualities are displayed at a temperature below the melting point of the material. The precise glass transition temperature for a material will depend on molecular weight, the rate of cooling and other factors.

A principal object of this invention is to reduce the occurrence of permanent deformation of vehicle seat components made from thermoplastic polymeric fibers. To this aim, the body is compressed during formation with a second, heavier load while above the glass transition temperature, but below the melting temperature of the fusable polymeric coating. The weaker bonds between fibers will break and the fibers will deform or creep during this compression step. Stronger bonds will be formed in the desired shape.

CROSS-REFERENCE TO COPENDING APPLICATION

The field of this invention generally relates to the field of the inventions disclosed in copending applications Ser. No. 08/324,219 filed on Oct. 17, 1994 and Ser. No. 08/324,220 filed on Oct. 17, 1994, assigned to the assignee of this application.

SUMMARY OF THE INVENTION

This invention is a method to efficiently manufacture a more durable component of a vehicle seat by molding a seat component body using two compression steps to improve resistance to permanent deformation. The vehicle seat component body consists of polymeric fibers molded to a predetermined shape.

At least a portion of the polymeric fibers will be coated with a thermoplastic polymeric coating that melts at a relatively low temperature. The function of this polymeric coating is to bind the fibers to each other when melted and cooled.

A polymer is a substance whose composition is characterized by multiple repetition of one or more species of atoms or groups of atoms linked to each other. A thermoplastic polymer refers to a polymer which is capable of being repeatedly softened by heating and hardened by cooling through a characteristic temperature range.

One possibility for the polymeric fiber used in this invention is a type of polyester, polyethylene terephthalate (PET). This material is widely used in many applications, such as beverage containers, and has been successfully recycled in large quantities. The mold apparatus used to carry out this invention consists of a mold cavity set in a lower mold member having a shape corresponding to the desired shape of the seat component. An upper mold member is used to apply pressure to the mass of polymeric fibers and hold them in a desired shape while the necessary bonds are formed. The upper mold member is also capable of applying a second, greater compressive force to the body. Both the upper and lower mold members are equipped to supply steam, hot air, or another heated atmosphere to the cavity.

Generally, the process of the present invention includes the steps of placing a predetermined amount of thermoplastic polymeric fibrous material inside of the mold cavity, lowering the top of the mold cavity into place above the fibers, and compressing the fibers with the appropriate pressure to form a body which is slightly larger than the desired shape of the resultant vehicle seat component body. The compression creates many contact points between coated and uncoated polymeric fibers.

Forced convection is then used to pass a heated atmosphere through the mold cavity. As the hot air or steam moves through the cavity, the polymeric coating which is on some of the fibers will melt and flow over the contact points with adjacent coated or uncoated fibers. The melted polymeric coating may also serve to bind the fabric cover to the polymeric fibrous body.

Once the body has cooled to a temperature below the melting point of the polymeric coating but above the glass transition temperature, a second compressive force is applied. By further compressing the body at this elevated temperature, the weakest polymeric bonds are broken, and the fibers deform or creep. Thus the body is pre-set during the molding process into the desired shape instead of being deformed during use as a vehicle seat component at elevated temperatures.

The body is then cooled completely. When the bonds formed have solidified, the mold cavity can be opened and the body will retain its shape and be safeguarded against large permanent deformation.

Additional objects and advantages of the invention will become apparent from the following description and the appended claims when considered in conjunction with the accompanying drawings.

DESCRIPTION OF THE PREFERRED EMBODIMENT

Figure 4:
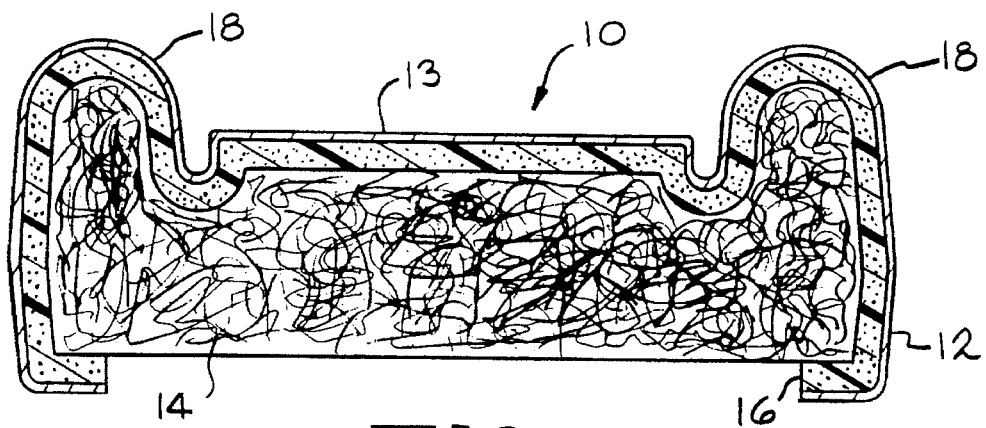
FIG. 4 is a cross-sectional view of the formed seat component.
Figure 5:
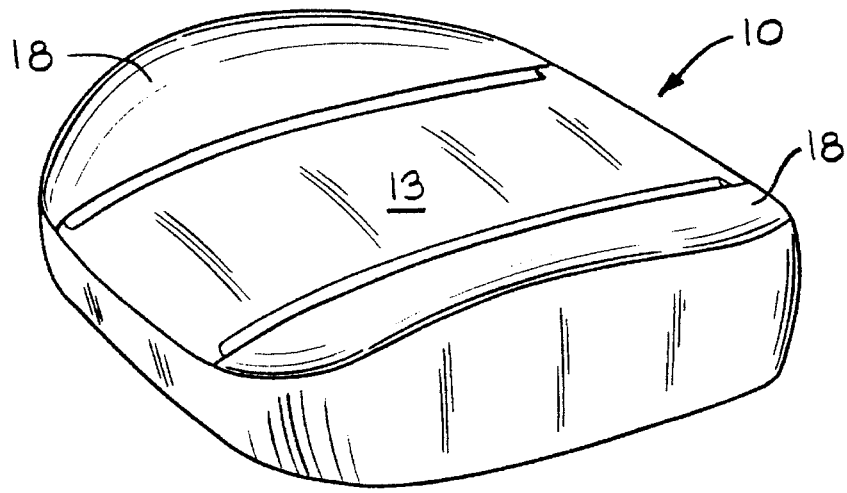
FIG. 5 is a perspective view of a completed seat component of the preferred embodiment consisting of a fibrous body and a fabric cover laminated to the body.

With reference to the drawing, a seat component body of the type to which this invention relates is shown generally at 10 in FIG. 5. The seat component 10 includes a fabric cover 12 shaped to form a main seating surface 13, bordered by supportive bolsters 18 which extend upwardly on opposite sides of the surface 13, as more clearly appears in FIG. 4. The body 14 of the seat component 10 consists of molded polymeric fibers. A porous polymeric layer 16 may also be included in the preferred embodiment.

A method for shaping a body 14 from fibrous polymeric material is disclosed by this invention. This method involves sequential compression steps which will improve the component's resistance to permanent deformation. The polymeric fibers used in this invention are chosen from the group defined as thermoplastic fibers, which include polyester, nylon and others depending on processing limitations. The use of polyester fibers is preferable because polyester is easily recyclable. More specifically, polyethylene terephthalate (PET) polyester offers the advantages of being easily recycled and having flame retardant variants.

Some of the polymeric fibers which comprise the body 14 will be coated with a fusible polymeric material. When an upper mold member 20 (FIG. 1) is lowered to compress the polymeric fibers, many contact points are created between coated and uncoated fibers. Then a heated atmosphere is passed through the mold cavity 22 causing the coating to melt and flow onto adjacent fibers. These contact points cool to form the bonds which hold the body 14 in the desired shape.

In a preferred embodiment, the polymeric coating may also be used to attach the fabric cover 12 to the body 14 in an efficient one-step process. However, the advantages of the present invention will be equally achieved if the fabric cover 12 is attached to the body 14 with an adhesive, by stitching, or by another method known to those skilled in the art.

The polymeric coating material is selected to have a melting temperature relatively lower than the core of the fiber. Examples of coating polymers are copolyester, polyethylene, and activated copolyolefin. Where PET is used for the core material, a copolymer of PET is used for the coating. The melting temperature of the PET copolymeric coating is about 110–220 C. (230°–428° F.). The PET core melts at approximately 260 C. (500° F.).

The thermoplastic fibers could be utilized in the form of non-woven batting, clusters, loose fibers or in other forms known to those skilled in the art. Fiber clusters having a one-quarter inch diameter will be used such as Ecofil™ polyester fiber clusters made by E. I. du Pont de Nemours and Company of Wilmington, Del. Alternatively, Celbond® polyester, manufactured by Hoechst Celanese Corporation of Somerville, N.J. can be used to make densified batting.

A fabric cover 12 is laminated to the body 14 of fibrous polymeric material. A porous polymeric layer 16 can also be laminated between the fabric cover 12 and the body 14. The entire vehicle seat component of this invention can be made totally reclaimable without a need to separate dissimilar materials if the fabric cover member 12 and the optional porous layer 16 are made from polyester. Dacron® polyester made by E. I. du Pont de Nemours and Company of Wilmington, Del. could be used for the fabric cover.

Figure 1:
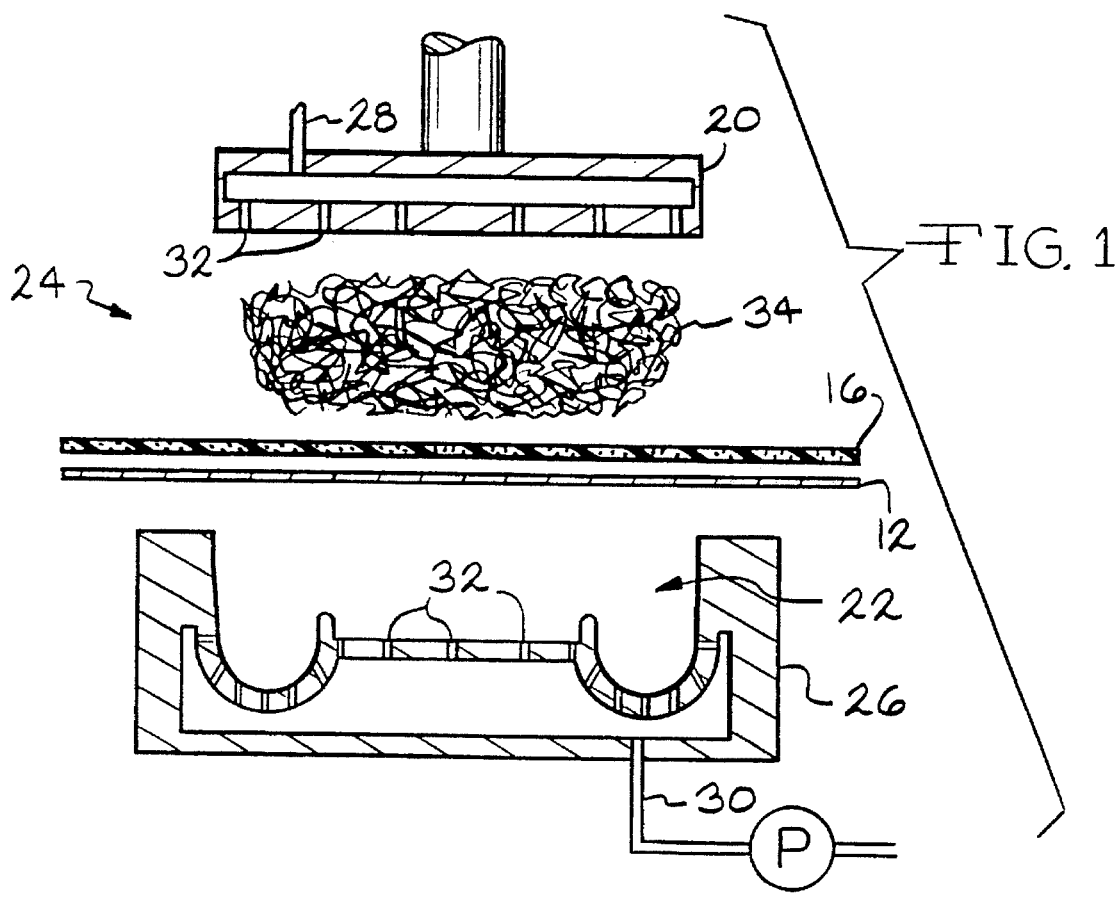
FIG. 1 is a cross-sectional exploded illustration of the mold apparatus for making the seat component of this invention, showing the raw materials for forming the seat component in their unaltered state suspended between the upper and lower members of the mold.
Figure 2:
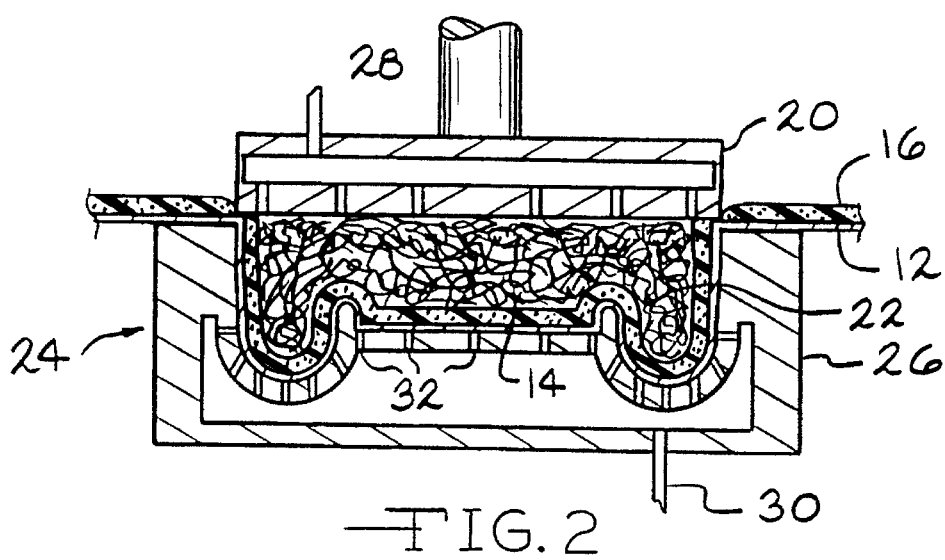
FIG. 2 is a cross-sectional view like FIG. 1 showing the mold closed during the first compression with the seat component materials inside the mold cavity.
Figure 3:
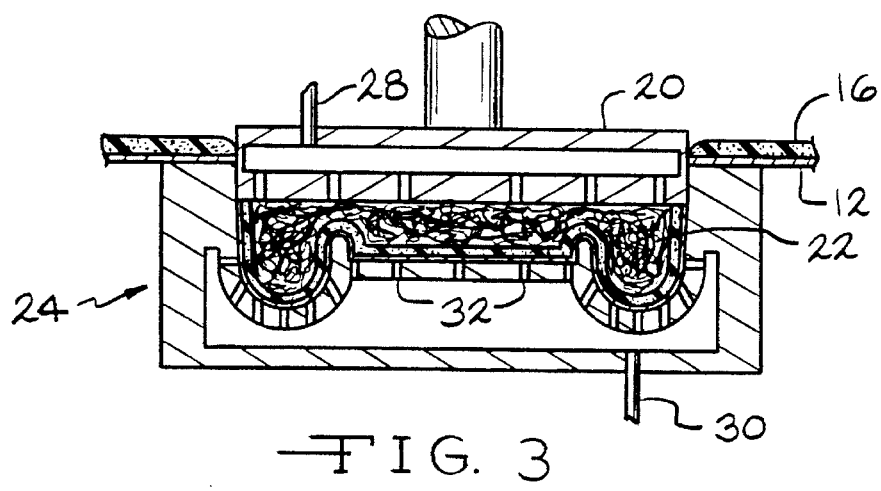
FIG. 3 is a cross-sectional view like FIG. 2 showing the upper mold member applying a greater pressure during the second compression with the seat component materials inside the mold cavity.

A mold apparatus for making the seat component of this invention is shown in FIGS. 1, 2 and 3 as including a mold assembly 24 consisting of an upper mold member 20 and a lower mold member 26 which cooperate to form and enclose a mold cavity 22. The mold assembly 24 has a steam or hot air inlet member 28 and exhaust member 30. In order to supply a hot atmosphere, the mold cavity 22 is preferably enclosed by a porous material. For ease of illustration, hot atmosphere vents 32 are shown which could alternatively supply the hot atmosphere to the mold cavity 22. The upper mold member 20 is capable of applying at least two different pressures to the body 14.

The method of carrying out this invention using the mold assembly 24 is illustrated in FIGS. 1, 2 and 3. First, the fabric cover member 12 is placed to line the lower mold member 26. The porous polymeric layer 16 is next placed, if desired to enhance comfort or styling, lining the lower mold member 26. A predetermined amount of polymeric fibers 34 is then placed inside the mold cavity 22. The upper mold member 20 is lowered down onto the apparatus as shown in FIG. 2, applying an initial pressure to the body.

The hot atmosphere used to bond the fibers may be supplied through numerous steam or hot air vents 32 placed in the upper mold member 20. The hot atmosphere is drawn through the mold cavity 22 by additional vents 32 in the lower mold member 26 through the use of an exhaust member 30. The temperature of the hot air or steam must be sufficiently hot to cause the coating to melt and flow over other fibers and the fabric cover or porous layer. This temperature will depend on the melting points of the polymeric fibers and coatings. The placement of the steam or hot air vents 32, exhaust member 30, and in-take member 28 could be varied while still achieving the advantages of the invention.

The body is then cooled to a temperature below the melting point of the polymeric coating, but still above the glass transition temperature of the coating. At this temperature the bonds formed will be pliable, but the coating will not flow. The upper mold member now applies a second pressure, greater than the initial pressure. Alternatively, the second pressure may be repeatedly applied and removed to accelerate the weak bond breaking and fiber creep. By further compressing the pad at this elevated temperature, the weakest polymeric bonds are broken and the fibers deform or creep. Alternatively, the pad could be allowed to cool completely after the application of the initial pressure, and then reheated to a temperature above the glass transition temperature of the polymeric coating before the second compression step.

The second pressure applied by the upper mold member is higher than the initial pressure and it may be repeatedly applied. This production variable, and other quantities such as the quantity of polymeric fibers and dimensions of the mold cavity will be determined by the desired density and dimensions of the resulting seat component.

After the second pressure is applied, the body is cooled completely. The mold cavity can then be opened and the body will retain its shape with the cover laminated to it and be safeguarded against large permanent deformation. The ends of the fabric cover member are secured on the bottom of the pad in the conventional manner.

Those skilled in the art can now appreciate that this invention can be implemented in a variety of forms. Therefore, while this invention has been described in connection with particular examples, the true scope of the invention should not be so limited since other modifications will become apparent to the skilled practitioner upon a study of the drawings, specification and following claims.

What is claimed:

1. The method of forming a body of a fibrous polymeric material consisting of polymeric fibers and a polymeric coating to a desired shape to form at least a portion of a vehicle seat comprising the steps of:

a. providing a mold cavity having a shape corresponding to said desired shape;

b. placing a predetermined quantity of said fibrous polymeric material in said cavity;

c. providing a polymeric coating on at least some of said fibrous material, said coating having a low melting point and a known glass transition temperature;

d. compressing said fibrous polymeric material in said cavity at an initial pressure sufficient to mold said fibrous polymeric material to a desired shape;

e. passing a heated atmosphere through said cavity at a temperature sufficiently high to melt said polymeric coating and cause the coating to flow in quantities sufficient to bond some of said fibers to others of said fibers and thereby maintain said fibrous body in the shape of said cavity;

f. passing a cooled atmosphere through said cavity at a temperature sufficient to cool said fibrous body to a temperature below the melting temperature of said polymeric coating but above said glass transition temperature of said polymeric coating;

g. further compressing the molded fibrous body to safeguard the body against permanent deformation when in use in a vehicle seat; and h. thereafter passing a cooling atmosphere through said cavity at a temperature sufficiently low to cool said polymeric coating to a temperature below the glass transition temperature so as to solidify the bonds formed between the fibers.

* * * * *